H. FAIRBANKS.
Device for Notching Scale-Beams.
No. 205,847. Patented July 9, 1878.
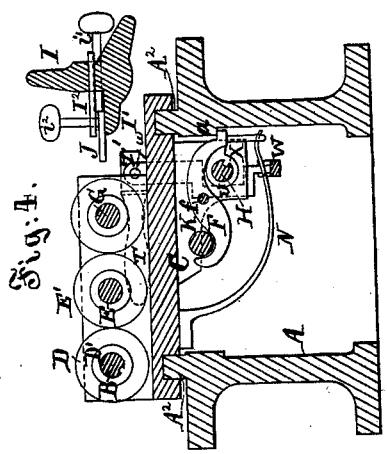
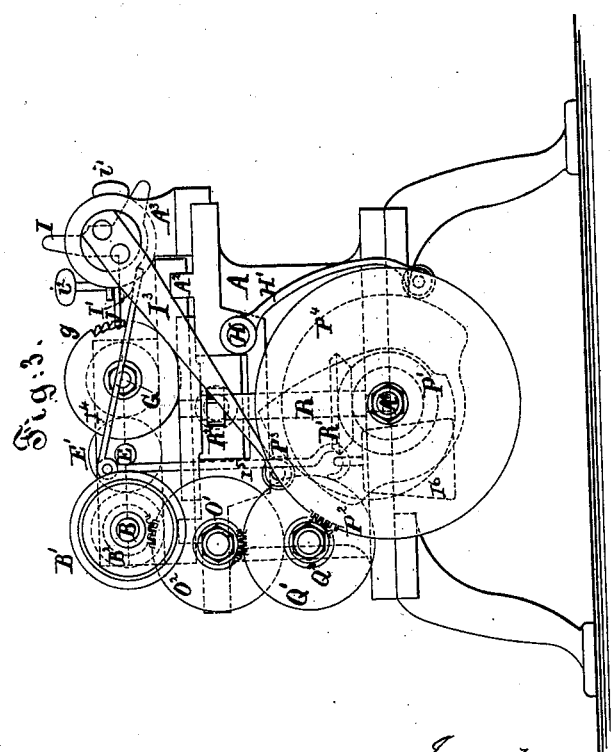

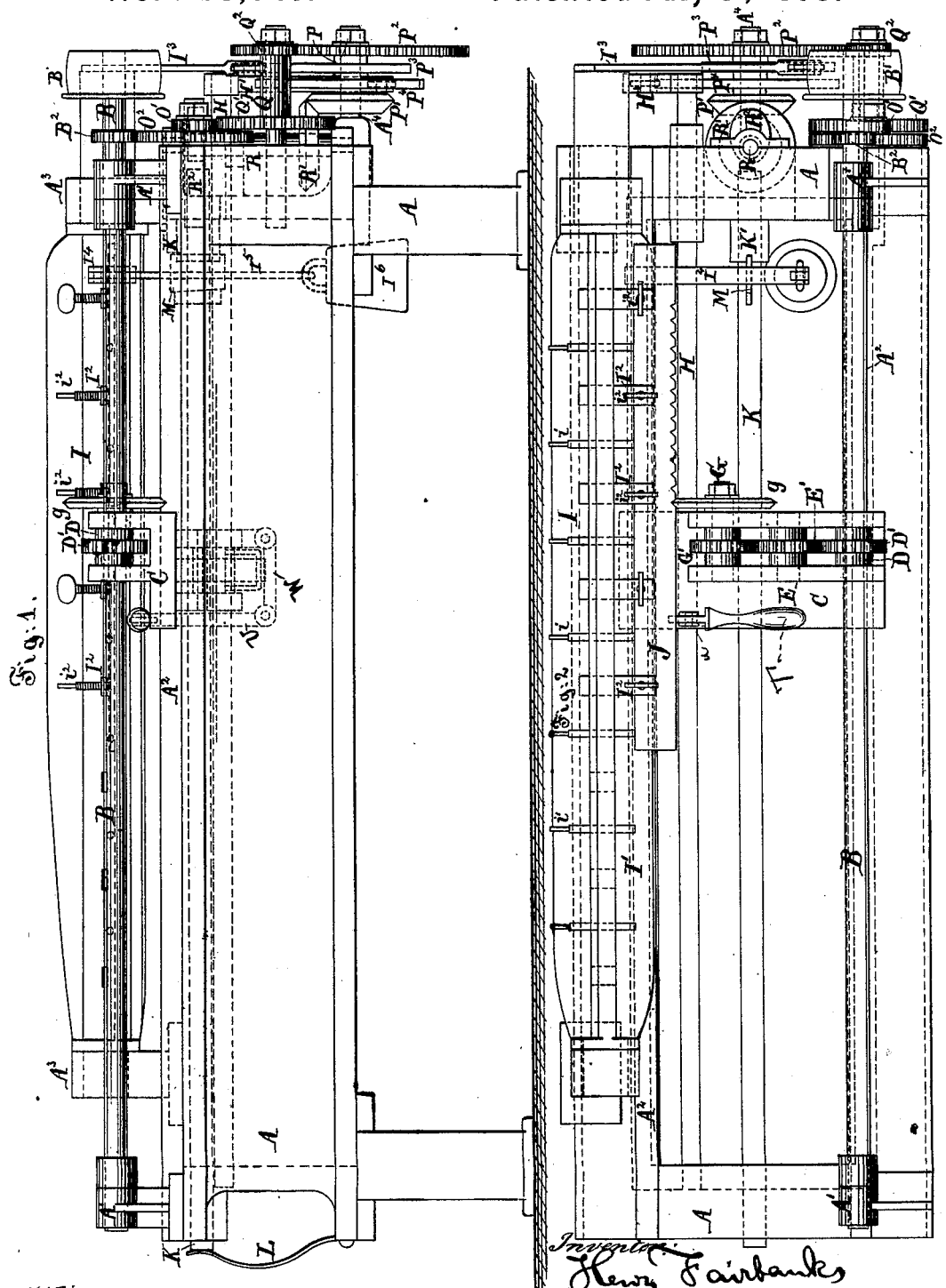

UNITED STATES PATENT OFFICE.

HENRY FAIRBANKS, OF ST. JOHNSBURY, VERMONT, ASSIGNOR TO E. & T. FAIRBANKS & CO., OF SAME PLACE.

IMPROVEMENT IN DEVICES FOR NOTCHING SCALE-BEAMS.

Specification forming part of Letters Patent No. 205,847, dated July 9, 1878; application filed April 20, 1878.

*To all whom it may concern:*

Be it known that I, HENRY FAIRBANKS, of St. Johnsbury, Caledonia county, State of Vermont, have invented certain new and useful Improvements relating to Dividing-Engines applicable particularly for Notching Scale-Beams; and I do hereby declare that the following is a full and exact description thereof.

The machine is capable of adjustment to graduate within a wide range of distances. The notches are produced by a milling action.

I effect the movement of the tool relatively to the beam in stepping from one notch to another by an eccentric or cam, with provisions for varying the length. I provide clamping means for holding the parts very firmly. The machine effects the graduations with great uniformity.

The following is a description of what I consider the best means of carrying out the invention.

The accompanying drawings form a part of this specification.

Figure 1 is a front elevation; Fig. 2, a plan view; Fig. 3, an end view, and Fig. 4 a transverse section.

The figures show the machine in the act of cutting a notch, and with the operation of producing such notch nearly completed.

Similar letters of reference indicate like parts in all the figures.

A is the fixed frame-work, of cast-iron or other suitable material. B is the main driving-shaft, which receives motion through a belt (not represented) running upon a pulley, $B^1$. This shaft is supported in fixed bearings $A^1$, which are fast on the frame A. Other bearings for this shaft B are provided in a movable carriage, C, which may be traversed on ways $A^2$. This carriage supports the milling tool or cutter $g$, which is fixed on a short shaft, G, firmly mounted in bearings in the carriage C. It receives a strong rotatory motion from the shaft B in any position in which it may be adjusted.

The shaft B is splined through nearly the whole of its length. A stout hub or sleeve, D, is mounted thereon between the bearings in the carriage C. This sleeve D carries a gear-wheel, $D'$, which gears into a corresponding wheel, $E'$, on a shaft, E, mounted in the same carriage, and this gear-wheel $E'$ in turn engages with the gear-wheel $G'$ on the arbor-shaft G. The carriage C may be shifted along the shaft B, and its wheels will receive and transmit the strong rotatory motion to the milling-tool $g$ in any position.

Pivoted under the carriage C is a lever, F, adapted to be lifted into firm contact with an offset or shoulder, $a$, on the inside of the frame A, and thereby to clamp down the carriage C and its connections, and hold it very stiffly united to the frame A during the period while the milling-tool $g$ is acting on a scale-beam. This lever is thrown up into the clamping position by an eccentric, X, which is also carried with the carriage C, and is feathered on a splined rocking shaft, H, which extends the whole length of the machine, and is impressed with the proper motion by a cam, which will appear farther on.

I is a stout rocking piece, mounted in bearings $A^3$, firmly set on the frame A. Its inner side is formed with a stout shelf, $I^1$, on which is bolted the beam J, which is to be treated, and, by a rocking of the support I, to be presented to the action of the milling-tool to produce a notch. The scale-beam J is adjusted laterally by screws $i^1$, and is firmly clamped down, when the proper position is attained, by pinching-screws $i^2$, which apply through stout slides $I^2$, which are fitted in holes in the casting I, and may be shifted into the several holes, as circumstances may require, in order to hold a long or a short beam. The means for rocking will be explained farther on.

K is a rod which I designate a "push-bar," extending the entire length of the machine. It is represented as round, but does not turn. It simply moves endwise by means of its cam at the other end. A transverse or cotter key, M, held firmly in the required position by a pinching-screw, (not represented,) which presses against its side, may be adjusted up and down in its slot or key-seat, and thereby compel the bar K, when forced home by the spring L, to come to rest in different positions within considerable limits. This key M performs the important function of controlling the length of the graduations. When this bar K is about to be moved by the action of the cam against the force of the spring L, the rocking shaft H makes a partial revolution, which liberates the lever F from its clamping hold on the shoulder $a$ of the framing, and enables the same lever F, or an extension or arm thereof, to engage with the bar K.

The carriage C presents two semi-cylindrical bearings on the upper face of the bar K. The lever F stands always in contact, or nearly in contact, with the smooth bar K on its under side. When the lever F is, by the action of the eccentric X, slightly turned on its pivot $f$ in one direction, it engages with the shoulder $a$ on the frame A, and holds the carriage C stationary. When, by the turning of the eccentric X, the hold of the lever F on the shoulder $a$ is relaxed, the lever F is turned by the force of a spring, N, which is fast on the carriage C, and engaged firmly with the bar K. Thus conditioned, the carriage C is certain to be moved longitudinally in the framing with the movement of the bar K, which commences soon after. At the end of its movement, and before it has commenced to return, the cam X is again turned up, and again induces a firm engagement of the lever F, and, consequently, of the carriage C, with the fixed frame-work, while the same movement liberates the lever F from its contact with the bar K, holding it just sufficiently out of contact to enable the bar to return idly in obedience to the force of the spring N. This action is repeated for each notch until so much of the length of the beam is notched as is required.

The rocking of the shaft H and of the piece I and the endwise movement of the bar K are induced at the proper time and to the proper extent through a train of mechanism mounted at the end of the framing. A spur-gear wheel, $B^2$, on the shaft B gears into a large wheel, $O^2$, which communicates motion through a small wheel, $O^1$, firmly fixed thereon, to a large wheel, $Q^1$, on a sleeve, Q. A small wheel, $Q^2$, fixed to this sleeve Q communicates a slow rotatory motion to a large gear-wheel, $P^2$, on which are mounted two cams, $P^3$ and $P^4$. The cam $P^3$ acts on a roller on the end of an arm, $I^3$, from the rocking piece I. The cam $P^4$ gives the proper rocking motion to the shaft H by acting on a roller on the end of an arm, $H'$. This latter I prefer to make of tempered steel flattened, so that, while possessing sufficient stiffness and strength to serve reliably, it is also capable of yielding elastically, so that the cam $P^4$ may communicate a larger motion to this arm $H'$ than it is possible to give to the eccentric X. The excess of motion thus absorbed by the spring insures that the lever F shall always be pressed into a firm and reliable contact with the shoulder $a$, even after the machine has become a little worn.

It will be understood that these several wheels and cams are supported on fixed centers fast on the frame-work A.

The wheel $P^2$ and its associated cams $P^3$ $P^4$ are mounted on a sleeve, P, which runs on a fixed stud, $A^4$, fast on the framing A. On the inner end of this sleeve P is a beveled-gear wheel, $P^1$, which meshes into a corresponding and equal gear-wheel, $R^1$, on an upright shaft. R. This latter shaft is mounted in fixed bearings, and carries a cam, $R^2$, which performs the important function of communicating endwise motion in one direction to the push-bar K. The effect of the arrangement is to throw the bar K slowly and reliably to a uniform point at each revolution, and to allow it to return to a greater or less distance, according as the cross-key M is adjusted up or down.

Instead of allowing the key M to act directly against the framing, I prefer to mount it, as described, farther inward on the push-bar K, and to provide a collar, $K'$, which is carried on the push-bar K, and is held with sufficient tightness by a pinching-screw. (Not shown in the drawings.)

There may be springs or weights additional to the devices here shown to aid in the promptness and perfection of any of the return motions. I have represented an arm, $I^4$, on the rocking piece I, carrying a weight, $I^6$, suspended by a link, $I^5$; but a spring may be substituted therefor, if preferred.

T is a hand-lever, carrying an eccentric, $T'$, which bears on the carriage C, and is connected, by a pivot, $u$, to a yoke, U, which extends down to a point below the rocking shaft H, where it is hinged to a short longitudinal bar or lever, W, which is pivoted at the other end to a strap from the carriage C, and stands always nearly in contact with the spring N.

It is frequently desirable to shift the carriage C from one end of its motion to the other. While the lever F is released from its engagement with the shoulder $a$, it is simply held engaged with the longitudinally-moving bar K by the force of the spring N. While thus conditioned, a tilting of the hand-lever T to raise the lever W will forcibly raise the spring N out of action, and release the lever F from its engagement with the bar K, and allow the carriage C to be shifted by hand to any desired position.

It is obviously important that the rocking of the shaft H and the endwise movement of the push-bar K be properly timed.

The cam $R^2$ might serve with some success if formed as a simple eccentric. I prefer, however, to give it the form represented, which holds the bar K a considerable period at each end of its motion. This increases the certainty that the clamping-lever F will have full time to change its position during the time while the bar K is at the end of its motion.

Various modifications may be made in many of the details. I can dispense with the whole or a portion of the gearing in the carriage C, and run the main driving-shaft either directly through the milling-wheel or through a single gear-wheel communicating motion directly thereto. I can turn the rocking piece I up instead of down to bring the beam J out of contact with the milling-tool $g$ to allow the shifting of the position of the latter.

I can provide separate clamping means for engaging the cutter-carriage C with the frame and with the longitudinally-traversing bar, respectively; but I prefer to accomplish it by the single lever represented. It is possible to attain greater perfection in theory by providing two sets of clamping means worked independently, and timing their operation so that the part which takes hold of the push-bar shall close its gripe thereon before instead of after the other arm has relaxed its hold on the fixed framing, and so that at the other end of the motion the carriage shall firmly clamp hold of the framing before it lets go of the push-bar; but the gain, when the work is made sufficiently substantial and rigid, will not, in my judgment, be sufficient to compensate for the increased complexity.

Some portions of the invention may be useful without the others. I believe that my push-bar, with the means of operating it, and the provisions for clamping the carriage C alternately to the fixed frame and to the push-bar, may be used with any form of marking device adapted simply to mark and score in place of the milling-tool $g$ to cut a deep notch.

I claim as my invention—

1. In a dividing-engine, the combination, with the carriage C carrying the cutter $g$, of the push-bar K, cam $R^2$, lever F, and spring N, whereby the push-bar is grasped by the lever and moved in one direction only, as herein specified.

2. In a dividing-engine, the combination, with the carriage C, of the push-bar K, cam $R^2$, lever F, and springs N L, whereby, after the push-bar has been moved in one direction, a return motion is induced, as herein specified.

3. The combination, with the frame A having the offset $a$, of the lever F, shaft H, with its eccentric X, and carriage C carrying the cutter $g$, whereby the carriage is securely held in place during the cutting of each notch, as herein specified.

4. In a dividing-engine, the cross-key M in the longitudinally-moving bar K, in combination with the moving cam $R^2$ and returning means L, as herein specified.

5. In a dividing and notching machine, the clamping-lever F and its operating means H X, in combination with suitable provision $a$ on the framing A for insuring a firm holding of the carriage which supports the milling-tool during the period of its operation, as herein specified.

6. In a dividing-engine, the double clamping means F, actuated as specified, and adapted to engage the carriage C at one period with the fixed framing A and at another period with the longitudinally-traversing bar K, as and for the purposes specified.

7. In a dividing and notching machine, the spring-lever H', in combination with the cam $P^3$ and with the cam or eccentric X and clamping means F, for engaging the carriage C firmly with the frame, and providing for imperfections and wear, as herein specified.

8. In a dividing and notching machine, the hand-lever T and its connections, in combination with the spring N and clamping-lever F, adapted to allow the convenient liberation of the carriage C from the push-bar K when required, for the purposes specified.

In testimony whereof I have hereunto set my name in presence of two subscribing witnesses.

HENRY FAIRBANKS.

Witnesses:
E. D. BLODGETT,
P. F. HAZEN.